(12) United States Patent
Yang et al.

(10) Patent No.: US 10,816,869 B2
(45) Date of Patent: Oct. 27, 2020

(54) IMAGE DISPLAY DEVICE

(71) Applicant: CheRay Co. Ltd., Hsinchu (TW)

(72) Inventors: Chun-Hsiang Yang, Hsinchu (TW);
Yi-Pai Huang, Hsinchu (TW);
Chih-Hung Ting, New Taipei (TW);
Kai-Chieh Chang, Kaohsiung (TW);
Jui-Yi Wu, Miaoli County (TW)

(73) Assignee: CHERAY CO. LTD., Hsinchu (TW)

( * ) Notice: Subject to any disclaimer, the term of this patent is extended or adjusted under 35 U.S.C. 154(b) by 48 days.

(21) Appl. No.: 16/103,990

(22) Filed: Aug. 16, 2018

(65) Prior Publication Data
US 2020/0057352 A1    Feb. 20, 2020

(51) Int. Cl.
*G02F 1/29* (2006.01)
*G02B 30/27* (2020.01)

(52) U.S. Cl.
CPC ............... *G02F 1/29* (2013.01); *G02B 30/27* (2020.01)

(58) Field of Classification Search
CPC ....... G02F 1/29; G02B 27/2214; G02B 30/10; G02B 30/27
See application file for complete search history.

(56) References Cited

U.S. PATENT DOCUMENTS 5,059,008 A * 10/1991 Flood .................. G02B 3/0056
349/202
8,345,144 B1 * 1/2013 Georgiev ............... G03B 11/00
348/335
2003/0108821 A1 * 6/2003 Mei ...................... G02B 3/0012
430/321
2004/0125459 A1 * 7/2004 Tanitsu ................ G02B 3/0056
359/619
2009/0161213 A1 * 6/2009 Lin ...................... G02B 3/0068
359/485.01

(Continued)

FOREIGN PATENT DOCUMENTS

TW       201131209 A1    9/2011
TW       I470280 B       1/2015

(Continued)

OTHER PUBLICATIONS

Hecht E. 1998 Optics (New York: Addison-Wesley), Chapter 5, p. 158.*

*Primary Examiner* — Hoan C Nguyen
(74) *Attorney, Agent, or Firm* — Li & Cai Intellectual Property (USA) Office

(57) ABSTRACT

An image display device includes a flat panel display, a lens array layer, and a microstructure dynamic optical layer. The lens array layer is located at a side of a display surface of the flat panel display, and can adjust light field. The microstructure dynamic optical layer is located at the side of the display surface of the flat panel display, and can be switched to have a microstructure function or not to have the microstructure function. When being switched to have the microstructure function, the microstructure dynamic optical layer can modulate a direction of light emitted from the flat panel display. Accordingly, the image display device can display a 3D dimensional image floating in mid-air, and enables a user to see the 3D dimensional image at an oblique viewing angle. The image display device can be used in different ways according to practical applications.

14 Claims, 5 Drawing Sheets

(56) References Cited

U.S. PATENT DOCUMENTS

| | | | | |
|---|---|---|---|---|
| 2010/0026797 A1* | 2/2010 | Meuwissen | ............ | H04N 13/31 |
| | | | | 348/59 |
| 2010/0073465 A1* | 3/2010 | Park | ..................... | H04N 13/315 |
| | | | | 348/51 |
| 2012/0092573 A1* | 4/2012 | Chen | ..................... | H04N 13/351 |
| | | | | 349/15 |
| 2012/0314021 A1* | 12/2012 | Tsang | ..................... | H04N 5/89 |
| | | | | 348/40 |
| 2014/0028933 A1* | 1/2014 | Chen | ..................... | G02B 27/26 |
| | | | | 349/15 |
| 2014/0232837 A1* | 8/2014 | Kim | ..................... | H04N 13/31 |
| | | | | 348/59 |
| 2015/0269893 A1* | 9/2015 | Wu | ..................... | G02B 27/2214 |
| | | | | 345/419 |
| 2016/0366401 A1* | 12/2016 | Wu | ..................... | H04N 13/398 |
| 2017/0219838 A1* | 8/2017 | Yang | ..................... | G02B 30/56 |
| 2018/0048883 A1* | 2/2018 | Yang | ..................... | G02B 30/56 |
| 2018/0231792 A1* | 8/2018 | Wang | ..................... | G02F 1/13 |

FOREIGN PATENT DOCUMENTS

| | | |
|---|---|---|
| TW | I614533 B | 2/2018 |
| TW | I615634 B | 2/2018 |

\* cited by examiner

IMAGE DISPLAY DEVICE

FIELD OF THE DISCLOSURE

The present disclosure relates to an image display device, and more particularly to an image display device that is used for displaying a stereo image and that can be switched between different display modes as required.

BACKGROUND OF THE DISCLOSURE

Generally, conventional stereo image display devices mainly employ the binocular vision imaging technology. For these kinds of image display devices, a user has to view a stereo image at a frontal viewing angle directly facing the image, and cannot view the stereo image at other viewing angles (i.e. an oblique viewing angle). In certain situations where the stereo image display devices are placed horizontally, viewers will naturally be staring at the image from an oblique angle, which prevents them from seeing a stereo (i.e., 3D) image as per the conventional technology. Moreover, the conventional stereo image display devices provide the user with visual stimuli in only one direction, i.e., either with the image projecting out or sinking in. Therefore, the conventional stereo image display devices cannot provide a vivid sensation that the image is escaping from the confines of a plane of the display surface and floating in mid-air.

A Taiwan Patent Publication No. 1614533 discloses a stereo image display device including a flat panel display, a lens array layer, and a microstructure layer. The lens array layer is disposed on a display surface of the flat panel display, and the lens array layer is configured to adjust light field. The microstructure layer is disposed on the lens array layer, and the microstructure layer is configured to modulate a direction of light emitted from the flat panel display. Accordingly, the stereo image display device is capable of displaying a stereo image floating in mid-air and enabling a user to see the stereo image at an oblique viewing angle.

However, the stereo image display device described above cannot flexibly change its way of use in practical application, so that the functions of the stereo image display device are limited. For example, there may be applications where the user can only see the stereo image at an oblique viewing angle, but cannot see the stereo image at the frontal viewing angle (e.g., viewing a mobile phone while standing upright). The stereo image display device only has a stereo image display mode, but cannot be switched between a planar image display mode and a stereo image display mode. Moreover, the stereo image display device can only display a full stereo image, but cannot partially display a stereo image and partially display a planar image.

In this regard, the present disclosure provides an image display device to overcome the aforementioned drawbacks.

SUMMARY OF THE DISCLOSURE

The main object of the present disclosure is to provide an image display device which is capable of flexibly changing its way of use in practical application and is more convenient to use.

To resolve the above technical problems, the present disclosure provides an image display device including a flat panel display, a lens array layer, and a microstructure dynamic optical layer. The flat panel display has a display surface. The lens array layer is located at a side of the display surface of the flat panel display. The lens array layer is capable of adjusting light field. The microstructure dynamic optical layer is located at the side of the display surface of the flat panel display. The microstructure dynamic optical layer is capable of being switched to have a microstructure function or not to have the microstructure function. When being switched to have the microstructure function, the microstructure dynamic optical layer is capable of modulating a direction of light emitted from the flat panel display.

To resolve the above technical problems, the present disclosure also provides an image display device including a flat panel display, a lens-type dynamic optical layer, and a microstructure layer. The flat panel display has a display surface. The lens-type dynamic optical layer is located at a side of the display surface of the flat panel display. The lens-type dynamic optical layer is capable of being switched to have a lens array function or not to have the lens array function. When being switched to have the lens array function, the lens-type dynamic optical layer is capable of adjusting light field. The microstructure layer is located at the side of the display surface of the flat panel display. The microstructure layer is capable of modulating a direction of light emitted from the flat panel display.

To resolve the above technical problems, the present disclosure also provides an image display device including a flat panel display, a lens-type dynamic optical layer, and a microstructure layer. The flat panel display has a display surface. The lens-type dynamic optical layer is located at a side of the display surface of the flat panel display. The lens-type dynamic optical layer has a first portion and a second portion, the first portion of the lens-type dynamic optical layer has a lens array function capable of adjusting light field, and the second portion of the lens-type dynamic optical layer does not have the lens array function. The microstructure layer is located at the side of the display surface of the flat panel display. The microstructure layer is capable of modulating a direction of light emitted from the flat panel display To resolve the above technical problems, the present disclosure also provides an image display device including a flat panel display and a dynamic optical layer. The flat panel display has a display surface. The dynamic optical layer is located at a side of the display surface of the flat panel display. The dynamic optical layer has a first surface and a second surface, the first surface has a dynamic lens array function, and the second surface has a dynamic microstructure function.

The advantage of the present disclosure is that since the image display device of the present disclosure includes a dynamic optical layer (i.e. the microstructure dynamic optical layer or the lens-type dynamic optical layer) which can be switched between different display modes according to different needs, the image display device can flexibly change the display modes in practical application and is more convenient to use.

The microstructure dynamic optical layer is capable of being switched to have a microstructure function or not to have the microstructure function, such that the image display device of the present disclosure enables a user to see a stereo image at an oblique viewing angle or at a frontal viewing angle. The lens-type dynamic optical layer is capable of being switched to have a lens array function or not to have the lens array function, such that the image display device of the present disclosure enables a user to see a stereo image or a planar image. A portion of the lens-type dynamic optical layer has the lens array function, and another portion of the lens-type dynamic optical layer does not have the lens array function, such that the image display device of the present disclosure enables a user to see a stereo image and a planar image at the same time.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
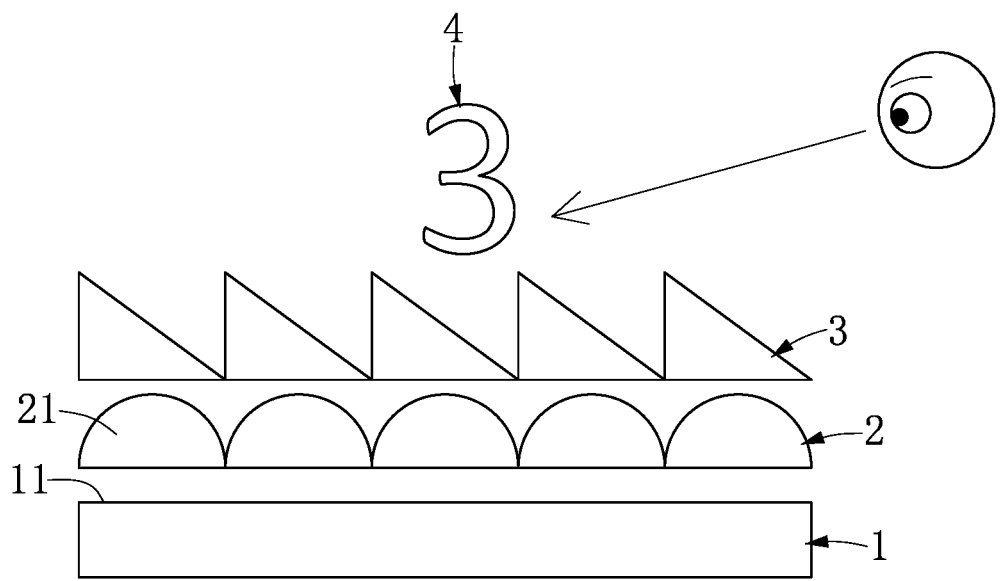
FIG. 1 is a schematic view showing an image display device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, the present embodiment provides an image display device, which may be used in many industries such as optoelectronics, medical, military, exhibition, display, education, entertainment, and consumer electronics. The image display device may be used in active or passive image display device, but the present disclosure is not limited thereto.

The image display device includes a flat panel display 1, a lens array layer 2, and a microstructure dynamic optical layer 3. The flat panel display 1 has a display surface 11. The lens array layer 2 is located at a side of the display surface 11 of the flat panel display 1, and the microstructure dynamic optical layer 3 is also located at the side of the display surface 11 of the flat panel display 1. The flat panel display 1, the lens array layer 2, and the microstructure dynamic optical layer 3 may be stacked sequentially from bottom to top in a three-layer structure, but the present disclosure is not limited thereto. For example, the stacking order of the lens array layer 2 and the microstructure dynamic optical layer 3 may be changed. In the present embodiment, the lens array layer 2 is disposed on (or disposed above) the display surface 11 of the flat panel display 1, and the microstructure dynamic optical layer 3 is disposed on (or disposed above) the lens array layer 2. The lens array layer 2 may be arranged in contact with or not in contact with the display surface 11 of the flat panel display 1, and the microstructure dynamic optical layer 3 may be arranged in contact with or not in contact with the lens array layer 2. In another embodiment of the present disclosure, the microstructure dynamic optical layer 3 is disposed on (or disposed above) the display surface 11 of the flat panel display 1, and the lens array layer 2 is disposed on (or disposed above) the microstructure dynamic optical layer 3.

The flat panel display 1 is located at the first layer (bottom layer) of the three-layer structure and is configured to display an image based on an integral photography technology. The flat panel display 1 may be in any specification as long as an algorithm can be applied. The image displayed by the display surface 11 of the flat panel display 1 is redrawn based on the algorithm and the specification of the flat panel display 1. The algorithm requires no image inversion process and requires only the depth information for calculation. The algorithm is applicable to a variety of display panels with different specifications. The algorithm has steps including defining coordinates, obtaining depth information, tracing ray of integral image, and reconstructing integral image. A unique feature of the present disclosure is that the image display device directly appoints a display position of a stereo image 4 floating in mid-air, and then employs the algorithm accordingly. Active flat panel display, such as phone, tablet, and flat screen, can be used as the flat panel display 1. The present disclosure does not intend to limit the type and structure of the flat panel display 1. The active flat panel display is characterized by the ability to control the switching between various stereo images and achieving an animation effect.

The primary purpose of the flat panel display 1 is to display the floating stereo image 4 processed by the algorithm, i.e., the integral image. The algorithm re-encodes the image using a color (RGB) and depth (D) information (i.e., four-dimensional). More specifically, the techniques of displaying the integral image can be categorized into two groups based on the type of the flat panel display 1. In the first group, the flat panel display 1 is an active display, such as a flat-screen display, a CRT TV, or an OLED, which can change the integral images flexibly and display full-color stereo images. In the second group, the flat panel display 1 is a passive display, such as a light box, a mask patterning, or a printing graphic, which cannot change the displayed image.

The lens array layer 2 is located at the second layer (middle layer) of the three-layer structure and is capable of adjusting the light field. Lenses 21 (i.e. condenser lenses) of the lens array layer 2 are configured to control angles of lights of a 3D object, thereby allowing a user to see the stereo image 4 at different viewing angles and to experience a stereoscopic visual effect with depth Different lenses 21 assign different angular information to each point of the 3D object, and the lights from different lenses 21 converges into a point with depth information in the air. That is, for each point of the 3D object, the lights from different angles are assigned to different pixels of the lenses 21. The curvatures of the lenses 21 are determined by the materials of the lenses 21, and the curvatures of the lenses 21 as well as the combination of the lenses 21 and the flat panel display 1 determine the height, the range of viewing angle, and the clarity of the stereo image. The un-reconstructed image displayed by the display surface 11 can be focused in the space above the lenses 21 through the lens array layer 2 instead of being focused to upper surfaces of the lenses 21.

In the present embodiment, the lens array layer 2 is made of a material with good optical characteristics, which includes, but is not limited to, polymethylmethacrylate (PPMA), polycarbonate (PC), polyethylene (PE), glass and other light-transmissive materials. The lens array layer 2 includes the plurality of lenses 21. It should be noted that the present disclosure does not intend to limit the arrangement and structure of the lens array layer 2. The lenses 21 have focusing function. The curvatures and the materials of the lenses 21 as well as the combination of the lenses 21 and the flat panel display 1 determine the height, the range of viewing angle, and the clarity of the stereo image.

Figure 6:
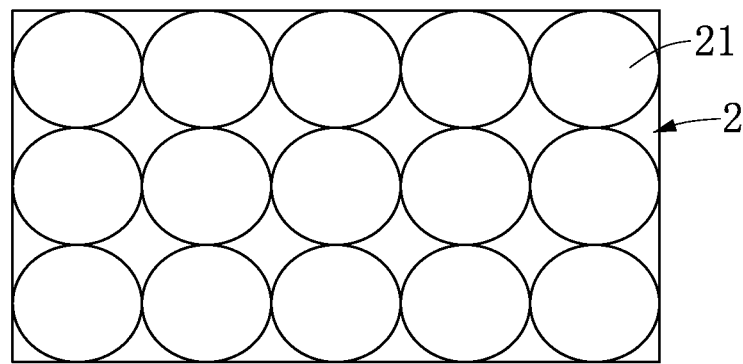
FIG. 6 is a schematic view showing a lens array layer of the image display device of the present disclosure arranged in an aligned arrangement.
Figure 7:
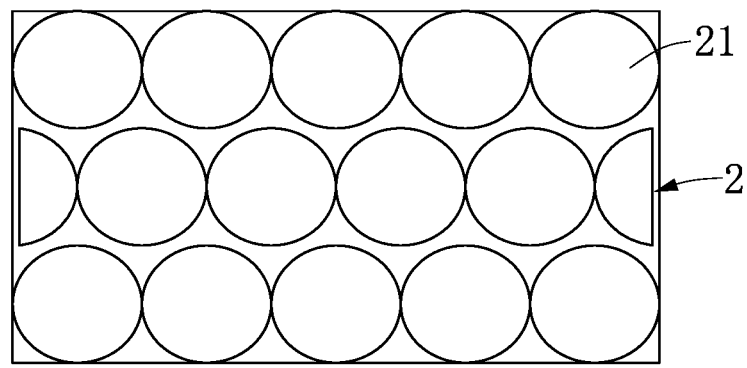
FIG. 7 is a schematic view showing a lens array layer of the image display device of the present disclosure arranged in a staggered arrangement.

The structure of the lens array layer 2 has a very significant correlation with the display effect of the image display device. The lens array layers 2 can be arranged in a rectangular arrangement or a hexagonal arrangement, that is, the lenses 21 in each two adjacent columns are arranged in an aligned arrangement (FIG. 6) or a staggered arrangement (FIG. 7). Further, each of the arrangements can be used to produce a stereo image.

The micro-structures of the lens array layer 2 are the lenses 21 with focusing function. The specification of each lens 21 will determine the lens focusing ability according to the refractive index n value of the material. The refractive index n value of the material ranges from 1.3 to 3.0. More specifically, the transmittance of the material is greater than or equal to 70%, and the reflectance of the material is less than or equal to 25%. Each lens 21 transmits light having a wavelength ranging from 300 nm to 1100 nm, and each lens 21 conforms to Lensmaker's equation: $1/f=(n-1)(1/R1+1/R2)$, in which R1 and R2 are respective curvature radiuses of two opposite surfaces of the lens 21, f is a focal length of the lens 21, and n is a refractive index of the lens 21. In addition, each lens 21 has a diameter of 10 um to 3 cm (preferably 10 um to 5 mm) so as to be suitable for display panels with different sizes.

The microstructure dynamic optical layer 3 (dynamic optical layer) is located at the third layer (top layer) of the three-layer structure and is capable of modulating a direction of light emitted from the flat panel display 1. The microstructure dynamic optical layer 3 may be a liquid crystal device (a liquid crystal microstructure layer), such that the microstructure dynamic optical layer 3 is capable of being switched to have a microstructure function or not to have the microstructure function.

When being switched to have the microstructure function, the microstructure dynamic optical layer 3 provides a microstructure function. For ease of illustration, the microstructure dynamic optical layer 3 shown in FIG. 1 is a microstructure layer having triangular microstructures. However, in practical applications, the microstructure dynamic optical layer 3 is not a solid microstructure layer. The microstructure dynamic optical layer 3 is configured to refract the light to an oblique angle with respect to a frontal angle, so that the user can see the stereo image 4 at the oblique viewing angle and not at the frontal viewing angle. Particularly, when the flat panel display 1 is placed horizontally, it is not natural for the user to see the stereo image 4 right above or right below the flat panel display 1. A conventional naked-eye 3D stereo image display device has a viewing angle problem so that the user cannot see the stereo image at the oblique viewing angle. Therefore, by employing the microstructure dynamic optical layer 3, the image display device of the present embodiment allows the user to see a stereo image naturally at the oblique viewing angle.

The image display device of the present embodiment includes the three-layer structure. The flat panel display 1 is configured to emit light which is an integral image. The lens array layer 2 is configured to converge the light (reconstruct the integral image) so as to generate the stereo image 4 in the air. The microstructure dynamic optical layer 3, which is switched to have the microstructure function, is configured to refract the light to the oblique angle. Accordingly, the user can see the stereo image 4 at the oblique viewing angle which meets the ergonomic viewing angle.

Figure 2:
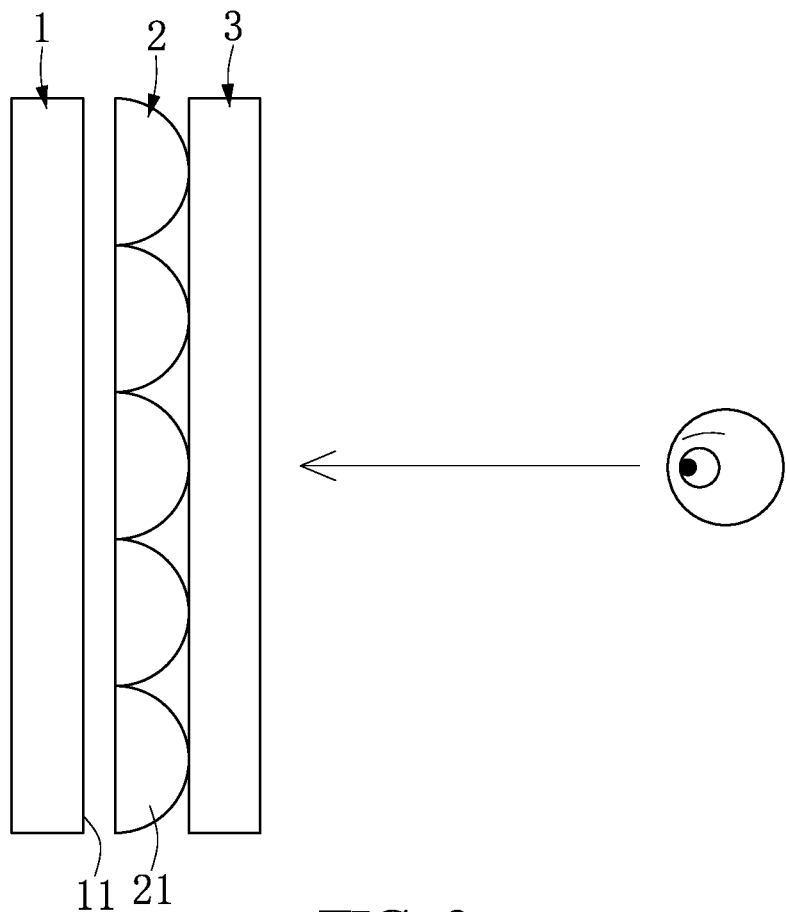
FIG. 2 is a schematic view showing another state of the display device of the first embodiment of the present disclosure.

Referring to FIG. 2, the microstructure dynamic optical layer 3 may be switched not to have the microstructure function so that the user can see the stereo image at the frontal viewing angle. For example, when using a general mobile phone, the user watches the mobile phone at the frontal viewing angle. Accordingly, the image display device of the present embodiment enables the user to see the stereo image at the oblique viewing angle or at the frontal viewing angle when the microstructure dynamic optical layer 3 is switched between different display modes. Since the image display device of the present embodiment can flexibly change the display modes in practical application, the image display device is more convenient to use.

Second Embodiment

Figure 3:
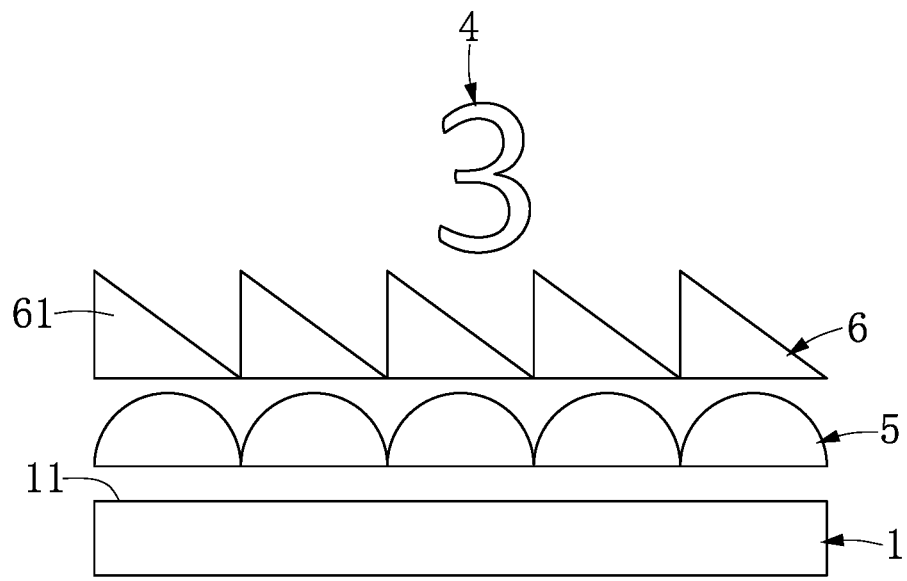
FIG. 3 is a schematic view showing an image display device according to a second embodiment of the present disclosure.

Referring to FIG. 3, in the present embodiment, the image display device includes a flat panel display 1, a lens-type dynamic optical layer 5, and a microstructure layer 6. The flat panel display 1 has a display surface 11. The lens-type dynamic optical layer 5 is located at a side of the display surface 11 of the flat panel display 1, and the microstructure layer 6 is also located at the side of the display surface 11 of the flat panel display 1. The flat panel display 1, the lens-type dynamic optical layer 5, and the microstructure layer 6 may be stacked sequentially from bottom to top in the three-layer structure, but the present disclosure is not limited thereto. For example, the stacking order of the lens-type dynamic optical layer 5 and the microstructure layer 6 may be changed. In the present embodiment, the lens-type dynamic optical layer 5 is disposed on (or disposed above) the display surface 11 of the flat panel display 1, and the microstructure layer 6 is disposed on (or disposed above) the lens-type dynamic optical layer 5. That is, the lens-type dynamic optical layer 5 is disposed at an upper side of the flat panel display 1, and the microstructure layer 6 is disposed at an upper side of the lens-type dynamic optical layer 5.

The lens-type dynamic optical layer 5 (dynamic optical layer) is located at the second layer (middle layer) of the three-layer structure and is capable of adjusting light field. The lens-type dynamic optical layer 5 may be a liquid crystal device (liquid crystal lens array layer), such that the lens-type dynamic optical layer 5 is capable of being switched to have a lens array function or not to have the lens array function. That is, when being switched to have the lens array function, the lens-type dynamic optical layer has a lens array structure with focusing function. For ease of illustration, the lens-type dynamic optical layer 5 shown in FIG. 3 is a lens array layer. However, in practical applications, the lens-type dynamic optical layer 5 is not a physical lens array layer.

The microstructure layer 6 is located at the third layer (top layer) of the three-layer structure and is capable of modulating a direction of light emitted from the flat panel display 1. The microstructure layer 6 is configured to refract the light to an oblique angle with respect to the frontal angle, so that the user can see the stereo image 4 at the oblique viewing angle and not at the frontal viewing angle. In the present embodiment, the microstructure layer 6 may be made of polyester (PET), polypropylene (PP), or polycarbonate (PC), but the present disclosure is not limited thereto. The microstructure layer 6 includes a plurality of microstructures 61. Each of the microstructures 61 has a triangular shape. More specifically, each of the microstructures 61 has an isosceles triangular shape or a right triangular shape. However, the present disclosure does not intend to limit the arrangement and structure of the microstructure layer 6.

The image display device of the present embodiment includes the three-layer structure. The flat panel display 1 is configured to emit light which forms the integral image. The lens-type dynamic optical layer 5, which is switched to have the lens array function, is configured to converge the light (reconstruct the integral image) so as to generate the stereo image 4 in the air. The microstructure layer 6 is configured to refract the light to the oblique angle. Accordingly, the user can see the stereo image 4 at the oblique viewing angle which meets the ergonomic viewing angle.

Figure 4:
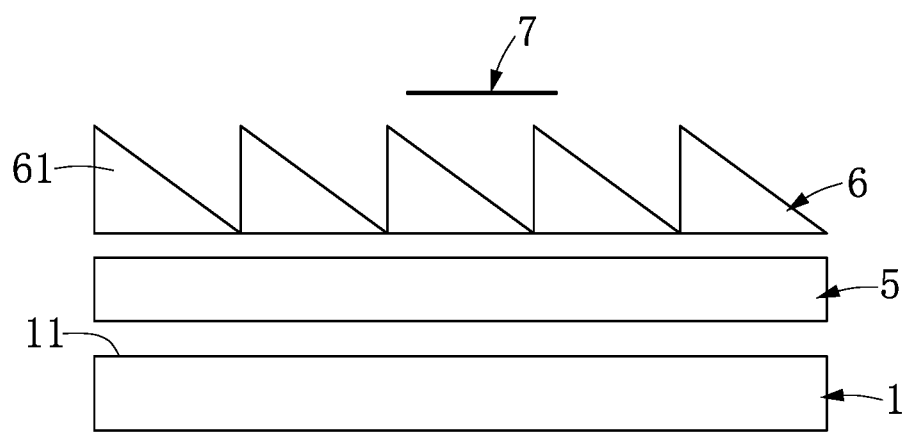
FIG. 4 is a schematic view showing another state of the display device of the second embodiment of the present disclosure.

Referring to FIG. 4, the lens-type dynamic optical layer 5 may be switched not to have the lens array function so that the user can see a planar image 7. Accordingly, the image display device of the present embodiment can be switched between a planar image display mode and a stereo image display mode. Since the image display device of the present embodiment can flexibly change the display modes in practical application, the image display device is more convenient to use.

Third Embodiment

Figure 5:
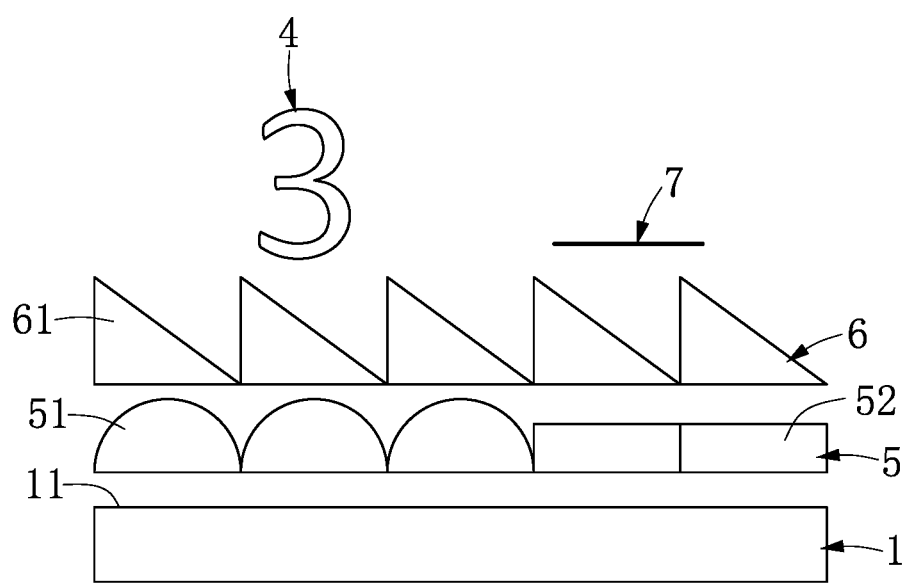
FIG. 5 is a schematic view showing an image display device according to a third embodiment of the present disclosure.

Referring to FIG. 5, in the present embodiment, the image display device includes a flat panel display 1, a lens-type dynamic optical layer 5, and a microstructure layer 6. The configuration of the image display device of the present embodiment is substantially the same as that of the second embodiment described above. The difference is that the lens-type dynamic optical layer 5 may be a liquid crystal device (liquid crystal lens array layer), such that a portion of the lens-type dynamic optical layer 5 has a lens array function. That is, the portion of the lens-type dynamic optical layer 5 having the lens array function has focusing function similar to the lens array, and is capable of adjusting light field. More specifically, the lens-type dynamic optical layer 5 has a first portion 51 and a second portion 52, the first portion 51 of the lens-type dynamic optical layer 5 has the lens array function capable of adjusting the light field, and the second portion 52 of the lens-type dynamic optical layer 5 does not have the lens array function.

Referring to FIG. 5, the first portion 51 of the lens-type dynamic optical layer 5 has the lens array function, such that the user can see the stereo image 4 from the first portion 51. The second portion 52 of the lens-type dynamic optical layer 5 does not have the lens array function, such that the user can see a planar image 7 from the second portion 52. Accordingly, the image displayed by the image display device of the present embodiment may be partially the planar image and partially the stereo image. The user can see the stereo image and the planar image at the same time. Since the image display device of the present embodiment can flexibly change its way of use in practical application, the image display device is more convenient to use.

In another embodiment of the present disclosure, the lens array layer in each of the above embodiments (i.e. the first embodiment) may be replaced by the dynamic optical layer (i.e. the liquid crystal device) so as to form the lens-type dynamic optical layer. The microstructure layer in each of the above embodiments (i.e. the second and third embodiments) may be replaced by the dynamic optical layer (i.e. the liquid crystal device) so as to form the microstructure dynamic optical layer. That is, the lens array layer and the microstructure layer may be dynamic optical elements at the same time, and the lens array layer and the microstructure layer may also be integrated into one dynamic optical element. In another embodiment of the present disclosure, the microstructure dynamic optical layer has a first portion and a second portion (not shown in the drawings), the first portion of the microstructure dynamic optical layer has the microstructure function capable of modulating the direction of the light, and the second portion of the microstructure dynamic optical layer does not have the microstructure function so that the user can see the stereo image at a frontal viewing angle. For example, when using a general mobile phone, the user watches the mobile phone at the frontal viewing angle.

Fourth Embodiment

Figure 8:
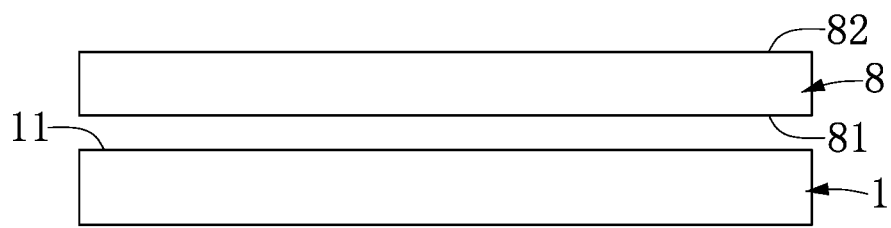
FIG. 8 is a schematic view showing an image display device according to a fourth embodiment of the present disclosure.

Referring to FIG. 8, in the present embodiment, the lens array layer and the microstructure layer may be the dynamic optical elements at the same time, and the lens array layer and the microstructure layer may also be integrated into one dynamic optical element. That is, the image display device includes a flat panel display 1 and a dynamic optical layer 8. The flat panel display 1 has a display surface 11, and the dynamic optical layer 8 is located at a side of the display surface 11 of the flat panel display 1. The dynamic optical layer 8 has a first surface 81 and a second surface 82, the first surface 81 has a dynamic lens array function, and the second surface 82 has a dynamic microstructure function.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An image display device, comprising:
a flat panel display having a display surface;
a lens array layer located at a side of the display surface of the flat panel display;
wherein the lens array layer is capable of adjusting light field; and
a microstructure dynamic optical layer located at the side of the display surface of the flat panel display; wherein the microstructure dynamic optical layer is capable of being switched to have a microstructure function or not to have the microstructure function; wherein the microstructure dynamic optical layer is electrically switchable,
wherein a light displayed from the display surface is able to be focused in a space above the microstructure dynamic optical layer through the lens array layer instead of being focused to an upper surfaces of the microstructure dynamic optical layer, so that a 3D dimensional image is formed in the space above the microstructure dynamic optical layer;
wherein the image display device defines a left viewing region, a middle viewing region, and a right viewing region that do not overlap each other,
wherein the microstructure dynamic optical layer is capable of modulating a direction of the light emitted from the flat panel display to only one of the left viewing region, the middle viewing region, and the right viewing region;
wherein when the microstructure dynamic optical layer is switched to have the microstructure function, the light emitted from the flat panel display is refracted by the microstructure dynamic optical layer to an oblique direction, so that the 3D dimensional image is able to be seen by a user at only one of the left viewing region and the right viewing region that are not in front of the image display device; and
wherein when the microstructure dynamic optical layer is switched to not have the microstructure function, the light emitted from the flat panel display is not refracted by the microstructure dynamic optical layer, so that the 3D dimensional image is able to be seen by the user at the middle viewing region that is in front of the image display device.

2. The image display device according to claim 1, wherein the microstructure dynamic optical layer is a liquid crystal device.

3. The image display device according to claim 1, wherein the lens array layer is a dynamic optical layer.

4. The image display device according to claim 3, wherein the dynamic optical layer is a liquid crystal device.

5. The image display device according to claim 1, wherein the microstructure dynamic optical layer has a first portion and a second portion, the first portion of the microstructure dynamic optical layer has the microstructure function capable of modulating the direction of the light, and the second portion of the microstructure dynamic optical layer does not have the microstructure function.

6. An image display device, comprising:
a flat panel display having a display surface;
a lens-type dynamic optical layer located at a side of the display surface of the flat panel display; wherein the lens-type dynamic optical layer is capable of being switched to have a lens array function or not to have the lens array function, and wherein when being switched to have the lens array function, the lens-type dynamic optical layer is capable of adjusting light field; and
a microstructure layer located at the side of the display surface of the flat panel display,
wherein a light displayed from the display surface is able to be focused in a space above the microstructure layer through the lens-type dynamic optical layer instead of being focused to an upper surfaces of the microstructure layer, so that a 3D dimensional image is formed in the space above the microstructure layer;
wherein the image display device defines a left viewing region, a middle viewing region, and a right viewing region that do not overlap each other;
wherein the microstructure layer is capable of modulating a direction of the light emitted from the flat panel display to only one of the left viewing region, the middle viewing region, and the right viewing region;
wherein the microstructure layer is a dynamic optical layer and is capable of being switched to have a microstructure function or not to have the microstructure function;
wherein the microstructure layer is electrically switchable;
wherein when the microstructure layer is switched to have the microstructure function, the light emitted from the flat panel display is refracted by the microstructure layer to an oblique direction, so that the 3D dimensional image is able to be seen by a user at only one of the left viewing region and the right viewing region that are not in front of the image display device; and
wherein when the microstructure layer is switched to not have the microstructure function, the light emitted from the flat panel display is not refracted by the microstructure layer, so that the 3D dimensional image is able to be seen by the user at the middle viewing region that is in front of the image display device.

7. The image display device according to claim 6, wherein the lens-type dynamic optical layer is a liquid crystal device.

8. The image display device according to claim 6, wherein the microstructure layer is a dynamic optical layer.

9. The image display device according to claim 8, wherein the dynamic optical layer is a liquid crystal device.

10. The image display device according to claim 6, wherein the lens-type dynamic optical layer has a first portion and a second portion, the first portion of the lens-type dynamic optical layer has the lens array function capable of adjusting the light field, and the second portion of the lens-type dynamic optical layer does not have the lens array function.

11. An image display device, comprising:
a flat panel display having a display surface;
a lens-type dynamic optical layer located at a side of the display surface of the flat panel display; wherein the lens-type dynamic optical layer has a first portion and a second portion, the first portion of the lens-type dynamic optical layer has a lens array function capable of adjusting light field, and the second portion of the lens-type dynamic optical layer does not have the lens array function; and a microstructure layer located at the side of the display surface of the flat panel display, wherein a light displayed from the display surface is able to be focused in a space above the microstructure layer through the lens-type dynamic optical layer instead of being focused to an upper surfaces of the microstructure layer, so that a 3D dimensional image is formed in the space above the microstructure layer, wherein the image display device defines a left viewing region, a middle viewing region, and a right viewing region that do not overlap each other;

wherein the microstructure layer is capable of modulating a direction of the light emitted from the flat panel display to only one of the left viewing region, the middle viewing region, and the right viewing region;

wherein the microstructure layer is a dynamic optical layer and is capable of being switched to have a microstructure function or not to have the microstructure function;

wherein the microstructure layer is electrically switchable;

wherein when the microstructure layer is switched to have the microstructure function, the light emitted from the flat panel display is refracted by the microstructure layer to an oblique direction, so that the 3D dimensional image is able to be seen by a user at only one of the left viewing region and the right viewing region that are not in front of the image display device; and wherein when the microstructure layer is switched to not have the microstructure function, the light emitted from the flat panel display is not refracted by the microstructure layer, so that the 3D dimensional image is able to be seen by the user at the middle viewing region that is in front of the image display device.

12. The image display device according to claim 11, wherein the lens-type dynamic optical layer is a liquid crystal device.

13. The image display device according to claim 11, wherein the microstructure layer is a dynamic optical layer.

14. An image display device, comprising:

a flat panel display having a display surface; and a dynamic optical layer located at a side of the display surface of the flat panel display; wherein the dynamic optical layer has a first surface and a second surface, the first surface has a dynamic lens array function, and the second surface has a dynamic microstructure function, wherein a light displayed from the display surface is able to be focused in a space above the dynamic optical layer through the dynamic optical layer instead of being focused to an upper surfaces of the dynamic optical layer so that a 3D dimensional image is formed in the space above the dynamic optical layer;

wherein the image display device defines a left viewing region, a middle viewing region, and a right viewing region that do not overlap each other;

wherein the second surface is capable of modulating a direction of the light emitted from the flat panel display to only one of the left viewing region, the middle viewing region, and the right viewing region;

wherein the second surface is capable of being switched to have a microstructure function or not to have the microstructure function;

wherein the second surface is electrically switchable;

wherein when the second surface is switched to have the microstructure function, the light emitted from the flat panel display is refracted by the second surface to an oblique direction, so that the 3D dimensional image is able to be seen by a user at only one of the left viewing region and the right viewing region that are not in front of the image display device; and wherein when the second surface is switched to not have the microstructure function, the light emitted from the flat panel display is not refracted by the second surface, so that the 3D dimensional image is able to be seen by the user at the middle viewing, region that is in front of the image display device.

* * * * *